(12) United States Patent
Shigemura et al.

(10) Patent No.: US 10,942,382 B2
(45) Date of Patent: Mar. 9, 2021

(54) OPTICAL ELEMENT AND METHOD OF MANUFACTURING OPTICAL ELEMENT

(71) Applicant: TIANMA JAPAN, LTD., Kanagawa (JP)

(72) Inventors: Koji Shigemura, Kawasaki (JP); Kunihiro Shiota, Kawasaki (JP)

(73) Assignee: TIANMA JAPAN, LTD., Kanagawa (JP)

( * ) Notice: Subject to any disclaimer, the term of this patent is extended or adjusted under 35 U.S.C. 154(b) by 108 days.

(21) Appl. No.: 16/157,641

(22) Filed: Oct. 11, 2018

(65) Prior Publication Data
US 2019/0121172 A1   Apr. 25, 2019

(30) Foreign Application Priority Data
Oct. 24, 2017 (JP) .............................. JP2017-205633

(51) Int. Cl.
| G02F 1/13 | (2006.01) |
| G02F 1/1343 | (2006.01) |
| G02F 1/167 | (2019.01) |
| G02F 1/1335 | (2006.01) |

(52) U.S. Cl.
CPC ........ *G02F 1/1323* (2013.01); *G02F 1/13439* (2013.01); *G02F 1/133524* (2013.01); *G02F 1/167* (2013.01); *G02F 2201/44* (2013.01)

(58) Field of Classification Search
CPC ............. G02F 1/1323; G02F 1/133524; G02F 1/13439; G02F 1/167; G02F 2201/44

USPC ...................... 359/296, 298, 599; 349/61, 66
See application file for complete search history.

(56) References Cited

U.S. PATENT DOCUMENTS

| 2007/0268586 A1 | 11/2007 | Mimura et al. |
| 2008/0089068 A1 | 4/2008 | Mimura et al. |
| 2011/0080538 A1 | 4/2011 | Shiota et al. |
| 2016/0077364 A1 | 3/2016 | Shiota |

FOREIGN PATENT DOCUMENTS

| JP | 2003-306340 A | 10/2003 |
| JP | 2007-334279 A | 12/2007 |
| JP | 2008-116913 A | 5/2008 |
| JP | 2011-095719 A | 5/2011 |
| JP | 2011-102834 A | 5/2011 |
| JP | 2016-062092 A | 4/2016 |

*Primary Examiner* — Kristina M Deherrera
(74) *Attorney, Agent, or Firm* — Sughrue Mion, PLLC

(57) ABSTRACT

Provided is a microlouver (optical element) having a transparent layer inclined to attain a desired viewing angle. The optical element includes patterned transparent layer and light absorbing layer on a transparent substrate. At least a part of the members of the transparent layer and the light absorbing layer are inclined with respect to the normal to the plane of the transparent substrate where patterns of the transparent layer and the light absorbing layer are provided. The inclination satisfies $|\alpha'(x)-\beta(x)|<\varphi$, where $\alpha'(x)$ represents a first angle which is an outgoing angle of light transmitted through the transparent layer from the transparent substrate at a point x on the plane, $\beta(x)$ represents a second angle which is an angle of sight of an observer, and $\varphi$ represents a third angle which is a threshold angle to attain the lowest desired brightness.

6 Claims, 13 Drawing Sheets

OPTICAL ELEMENT AND METHOD OF MANUFACTURING OPTICAL ELEMENT

CROSS-REFERENCE TO RELATED APPLICATIONS

This Non-provisional application claims priority under 35 U.S.C. § 119(a) on Patent Application No. 2017-205633 filed in Japan on Oct. 24, 2017, the entire content of which is hereby incorporated by reference.

BACKGROUND

This disclosure relates to an optical element called a microlouver for limiting the range of outgoing direction of light transmitted therethrough and a method of manufacturing the optical element.

Flat panel display devices like liquid crystal display devices and Organic Light Emitting Diode (OLED) display devices are employed as display devices for various information processing devices such as mobile phones, personal digital assistants (PDA), automatic teller machines (ATM), and personal computers; display devices providing a wide range of view are available for practical use.

In recent years, increase in size and usage of display screens yields demand for various light distribution characteristics in the display devices providing a wide range of view. Particularly, from the viewpoint of information leakage, the demand for devices to limit the range of view and devices not to provide light in unnecessary directions has been increasing to prevent peeping.

SUMMARY

To meet the foregoing demand, a technology of limiting the range of view by incorporating a microlouver (optical element) like the one disclosed in JP 2007-334279 A into a liquid crystal display device has been in practical use.

An aspect of this disclosure is an optical element comprising: a transparent substrate; a transparent layer; and a light absorbing layer. The transparent layer and the light absorbing layer are patterned on the transparent substrate. At least a part of the transparent layer and at least a part of the light absorbing layer are inclined at given angles with respect to the normal to a plane of the transparent substrate where the transparent layer and the light absorbing layer are patterned. The inclination satisfies the following formula (1). Where $\alpha'(x)$ represents a first angle, which is an outgoing angle of light emitted from under the transparent substrate toward the transparent layer at a point x on an axis parallel to the plane; $\beta(x)$ represents a second angle, which is an angle of sight of an observer who receives the light coming out from the transparent layer, the angle of sight being determined by the point x and an observation point of the observer; and $\varphi$ represents a third angle, which is a threshold angle to attain the lowest desired brightness determined based on a relationship between the outgoing angle of light that goes out from the transparent layer and brightness is attained.

$$|\alpha'(x)-\beta(x)|<\varphi \quad (1)$$

EMBODIMENTS

First Embodiment

Hereinafter, an optical element in the first embodiment and a method of manufacturing the same are described.

Figure 1:
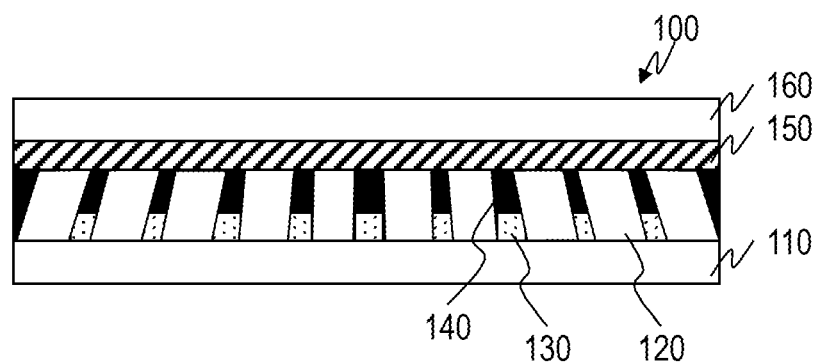
FIG. 1 is a cross-sectional diagram of an optical element in a first embodiment.
Figure 2:
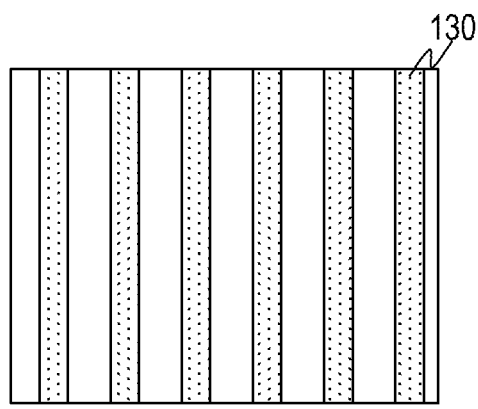
FIG. 2 is a diagram illustrating an example of a pattern of a conductive light-blocking layer in the first embodiment.

First, a basic configuration of the optical element (microlouver) of this disclosure is described. FIG. 1 is a cross-sectional diagram of the optical element in the first embodiment. FIG. 2 is a diagram illustrating an example of a pattern of a conductive light-blocking layer in the first embodiment.

FIG. 1 is a cross-sectional diagram of an optical element 100 cut along the thickness of the optical element 100. The optical element 100 includes a transparent substrate 110, a transparent layer 120, a conductive light-blocking layer 130, a light absorbing layer 140, a transparent electrode layer 150, and another transparent substrate 160. Light enters the optical element 100 incorporated in a liquid crystal display device from the transparent substrate 110 in the direction toward the transparent substrate 160. The arrangement of the layers, for example the transparent electrode layer 150, can be changed as appropriate. Although the transparent electrode layer 150 in FIG. 1 is provided on the observer side, it can be provided on the backlight side.

The transparent substrate 110 and the transparent substrate 160 can be made of glass or resin. In this embodiment, the transparent substrate 110 needs to deflect because of its own weight, a material having a Young's modulus to deflect because of its own weight is preferable for the transparent substrate 110.

The conductive light-blocking layer 130 is made of a metallic material such as aluminum and has a specific pattern. For example, a planar pattern as illustrated in FIG. 2 where rectangular members of the material are disposed at regular intervals is formed. The planar pattern in FIG. 2 is an example and the pattern is not limited to this. For example, a grid pattern is also acceptable. The light absorbing layer 140 is provided on the conductive light-blocking layer 130. The transparent layer 120 is provided on the transparent substrate 110 in the spaces where no conductive light-blocking layer 130 is provided. The transparent layer 120 and the light absorbing layer 140 are disposed in specific patterns.

As illustrated in FIG. 1, the transparent layer 120 and the light absorbing layer 140 of the optical element 100 are formed to be in parallel to the normal to the surface of the transparent substrate 110 in the central part and to be inclined toward the center of the optical element 100 in the peripheral parts. The angle of inclination increases with the distance from the center of the optical element 100.

Partially inclining the transparent layer 120 and the light absorbing layer 140 with respect to the normal to the surface of the transparent substrate 110 contributes to controlling the transmission rate in the peripheral part to be equal to the transmission rate in the central part. The transmission rate can be calculated as follows: Provide a uniform light source under the transparent substrate 110 and observe the emitted light from above the transparent substrate 160. Assign the brightness when seen at the highest angle to the denominator and assign the brightness when seen at a lowest angle to the numerator.

The cross-section of each member of the transparent layer 120 is narrower in width on the side of the transparent substrate 160 than the side of the transparent substrate 110. The thickness of the transparent layer 120 is preferably within a range from 30 µm to 300 µm and the width of each member of the transparent layer 120 is preferably within a range from 5 µm to 150 µm on the side of the transparent substrate 110. Each member of the light absorbing layer 140 has a width preferably within a range from 1 µm to 30 µm on the side of the transparent substrate 110.

The light absorbing layer 140 is composed of electrophoretic elements each including electrophoretic particles and dispersion medium. An electric field is generated on the light absorbing layer 140 by applying a voltage across the conductive light-blocking layer 130 and the transparent electrode layer 150. The electrophoretic particles move or disperse within the light absorbing layer 140 depending on ON or OFF of the voltage. With this operation, the optical element 100 can be switched between a narrow viewing field mode to transmit less light and a wide viewing field mode to transmit more light.

Taking a liquid crystal display device including the optical element 100 as an example, the light emitted from the backlight (not illustrated) provided on the side of the transparent substrate 110 passes through the optical element 100 and converges right at the position of the observer located substantially right in front of the liquid crystal display device. Accordingly, the image on the peripheral region of the liquid crystal display device can be observed clearly.

Figure 3:
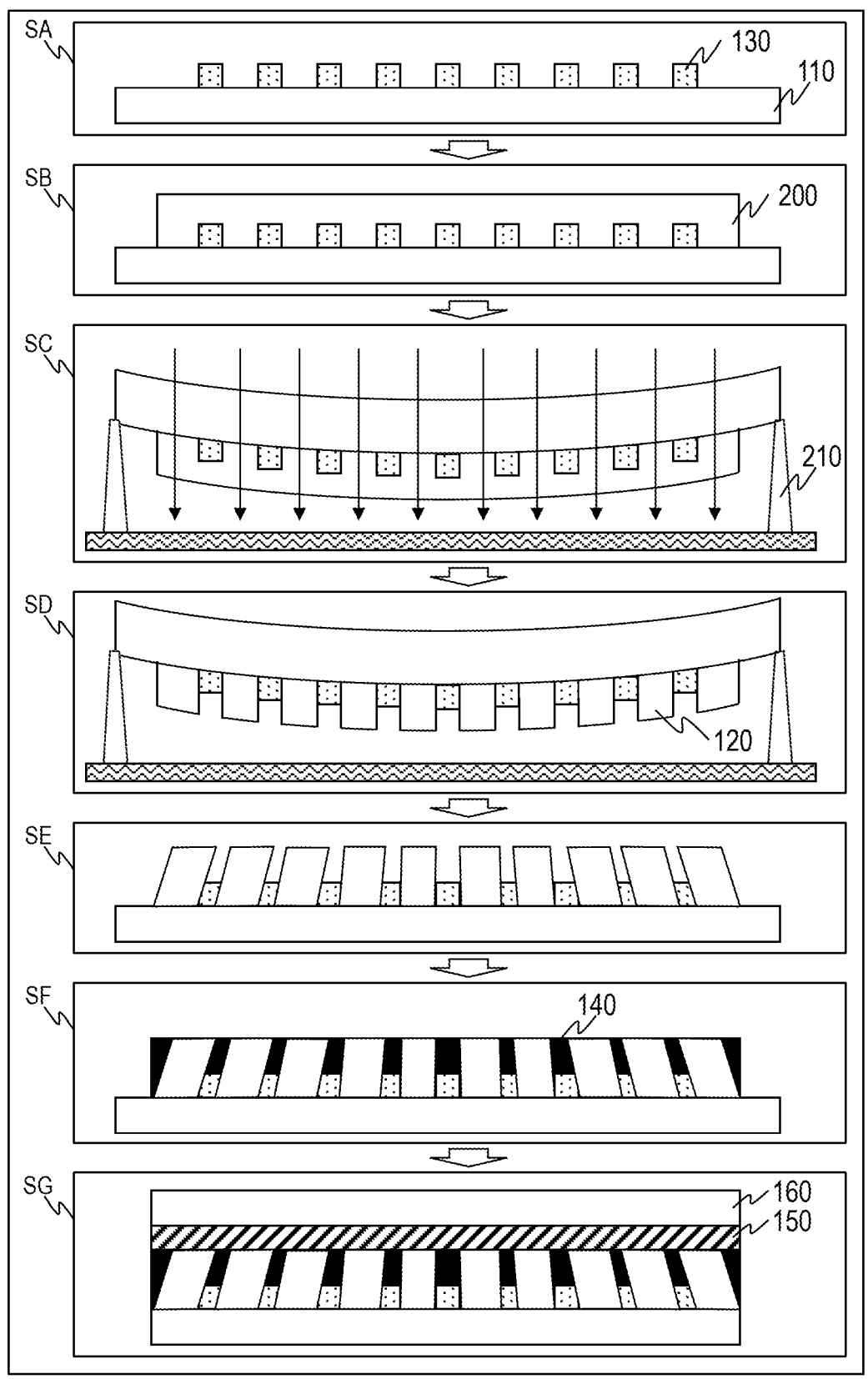
FIG. 3 is a diagram for explaining the method of manufacturing the optical element in the first embodiment.
Figure 4A:
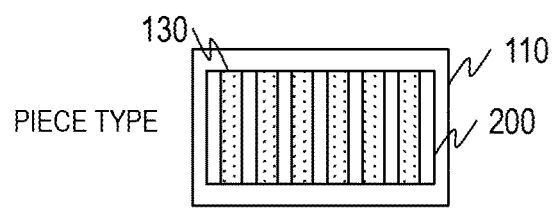
FIGS. 4A, 4B, and 4C are diagrams illustrating examples of the configuration of a substrate to manufacture the optical element in the first embodiment.
Figure 4B:
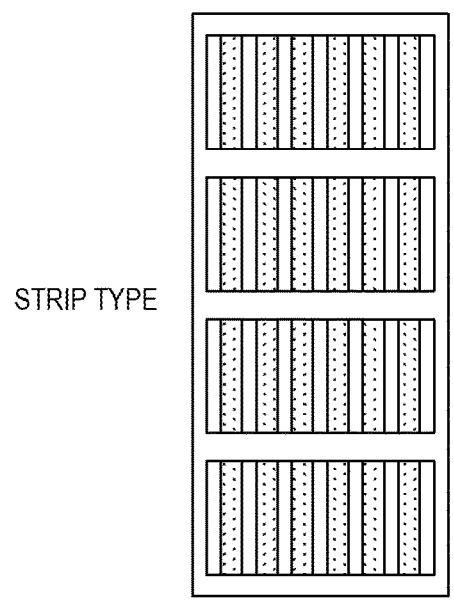
Figure 4C:
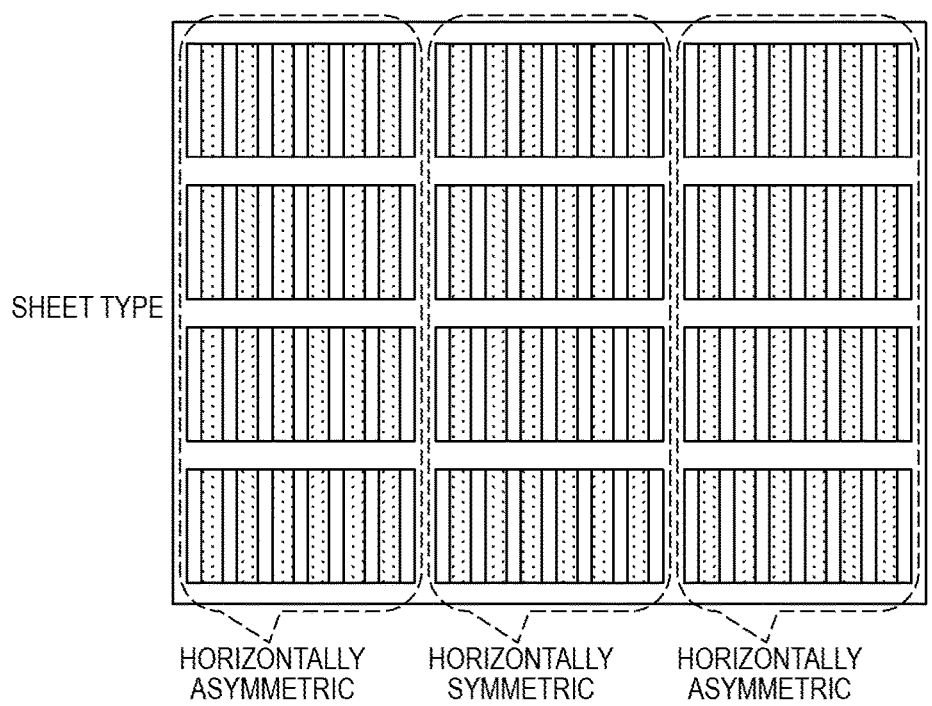

Next, a method of manufacturing the optical element 100 is described. FIG. 3 is a diagram for explaining the method of manufacturing the optical element 100 in the first embodiment. FIGS. 4A, 4B, and 4C are diagrams illustrating examples of the configuration of the substrate to manufacture the optical element 100 in the first embodiment.

The following description is based on an assumption that a not-illustrated manufacturing system performs the process steps. The manufacturing system includes different devices for individual steps. The manufacturing system may be configured to perform a plurality of steps with one device.

At Step SA in FIG. 3, the manufacturing system forms a conductive light-blocking layer 130 on a transparent substrate 110 in a predetermined pattern.

At Step SB in FIG. 3, the manufacturing system forms a transparent photosensitive resin layer 200 by applying a transparent photosensitive resin onto the transparent substrate 110.

To apply the transparent photosensitive resin, a film formation technique such as slit die coating, wire coating, applicator coating, dry film transfer, or spray coating is employed.

For the transparent photosensitive resin layer 200, a chemically-amplified photoresist (product name: SU-8) available from MicroChem Corp. can be used.

SU-8 is an epoxy-based negative resist in which a photoinitiator generates an acid in response to ultraviolet rays to polimerize a curable monomer using the generated protonic acid as catalyst. SU-8 has high transparency within the visible spectrum. SU-8 dissolves well in a solvent such as cyclopentanone, propylene glycol methyl ether acetate (PG-MEA), gamma-butyrolactone (GBL), or methyl isobutyl ketone (MIBK) because the curable monomer in SU-8 has a comparatively small molecular weight before being cured. Accordingly, SU-8 is advantageous to form a thick film easily.

SU-8 can provide a pattern having a high aspect ratio of 5 or more. Since the curable monomer has many functional groups, cured SU-8 becomes highly dense cross-bridge, having high stability in thermal and chemical properties. Accordingly, SU-8 facilitates the processes after the patterning.

It should be noted that SU-8 is an example and the material for the transparent photosensitive resin layer 200 is not limited to this.

At Steps SC and SD, the manufacturing system sets the transparent substrate 110 to a support device 210 in such a manner that the transparent photosensitive resin layer 200 is located at the bottom. As a result, the transparent substrate 110 deflects because of its own weight. The manufacturing system patterns the transparent photosensitive resin layer 200 by irradiating the deflected transparent substrate 110 with collimated exposure light from the above (back) of the transparent substrate 110 to form a transparent layer 120. Compared to the transparent substrate 110, the conductive light-blocking layer 130 and the transparent photosensitive resin layer 200 are thin enough to ignore their weights. Accordingly, it can be considered that the deflection of the transparent substrate 110 depends on only the weight of the transparent substrate 110.

The transparent substrate 110 may have an alignment mark to be matched with the support point of the support device 210. The support device 210 preferably has linear supporters standing in parallel to the end faces of the transparent substrate.

In this embodiment, all processes after the patterning until post baking are performed in the state where the transparent photosensitive resin layer 200 faces downward.

Patterning the transparent photosensitive resin layer 200 after the transparent substrate 110 deflects because of its own weight achieves the following: the members of the transparent layer 120 and the light absorbing layer 140 are formed to stand at substantially 90 degrees with respect to the surface of the flattened transparent substrate 110 in the central part of the transparent substrate 110 and to incline at angles smaller than substantially 90 degrees with respect to the surface of the flattened transparent substrate 110 in the peripheral parts.

As noted from the above, an optical element 100 that converges light at a different position can be manufactured by adjusting the shape of the transparent substrate 110. As a result, a liquid crystal display device with which the image can be seen only from specific directions is achieved.

The patterning is performed using the conductive light-blocking layer 130 provided on the transparent substrate 110. Since the conductive light-blocking layer 130 is attached tightly to the transparent photosensitive resin layer 200, generation of edge beads at the edge of the area where the transparent photosensitive resin layer 200 is applied, decrease in resolution because of poor surface flatness caused by variation in film thickness in the application area, or variation among patterns does not occur. Accordingly, the patterning in this embodiment achieves stable resolution.

The light source for the exposure in the patterning step uses an ultraviolet (UV) light source, for example.

The shape of the transparent substrate 110 to be processed at Steps SC and SD can be a piece type as illustrated in FIG. 4A, a strip type as illustrated in FIG. 4B, or a sheet type as illustrated in FIG. 4C. Each of FIGS. 4A, 4B, and 4C represents a transparent substrate 110 at Step SB when seen from above.

The transparent substrates 110 in FIGS. 4A, 4B, and 4C are set to the support device so that the vertical sides of the transparent substrate 110 are supported by the support device. In this setting, the sides to be supported by the support device are controlled to become parallel to the long sides of the rectangular members of the conductive light-blocking layer 130. Accordingly, in the case of the piece type or the strip type, optical elements 100 having horizontally symmetric transparent layer 120 and light absorbing layer 140 are manufactured. In the case of the sheet type, optical elements 100 having horizontally symmetric transparent layer 120 and light absorbing layer 140 are manufactured from the central part of the sheet and optical elements 100 having horizontally asymmetric transparent layer 120 and light absorbing layer 140 are manufactured from the parts other than the central part of the sheet.

At Step SE in FIG. 3, the manufacturing system detaches the transparent substrate 110 from the support device 210, flips over the transparent substrate 110 so that the transparent layer 120 will be located upper than the transparent substrate 110, and places the transparent substrate 110 to become flat.

At Step SF in FIG. 3, the manufacturing system fills the spaces formed in the transparent layer 120 and the conductive light-blocking layer 130 with electrophoretic elements to form a light absorbing layer 140.

At Step SG in FIG. 3, the manufacturing system laminates a transparent electrode layer 150 and a transparent substrate 160 onto the transparent layer 120 and the light absorbing layer 140. The transparent electrodes included in the transparent electrode layer 150 can be made of indium tin oxide (ITO), for example.

To deflect a transparent substrate 110 by applying an external force, a device for applying stable and uniform external force to the transparent substrate 110 needs to be newly prepared. It elevates the manufacturing cost and moreover, making uniform deflection of the transparent substrate 110 is difficult. In this embodiment, however, the transparent substrate 110 deflects because of its own weight. Accordingly, the manufacturing cost does not increase and uniform deflection among transparent substrate 110 is achieved.

Figure 5A:
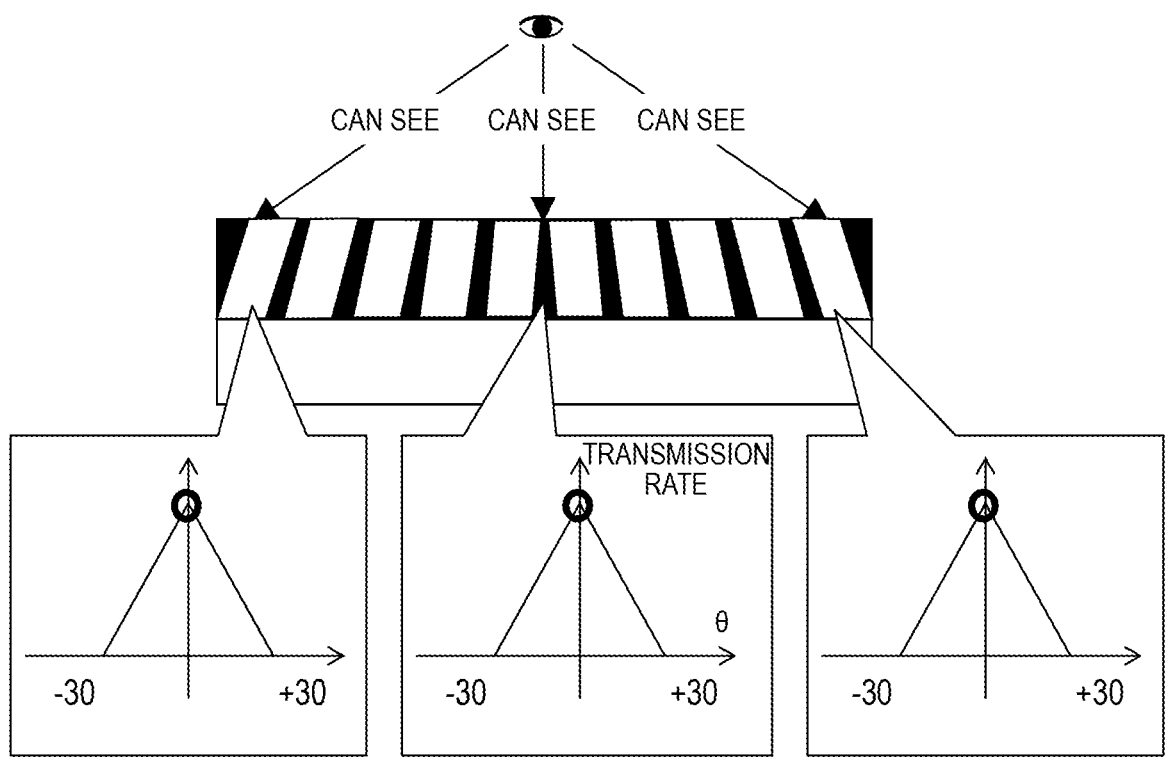
FIGS. 5A and 5B are diagrams for illustrating effects when the optical element in the first embodiment is used.
Figure 5B:
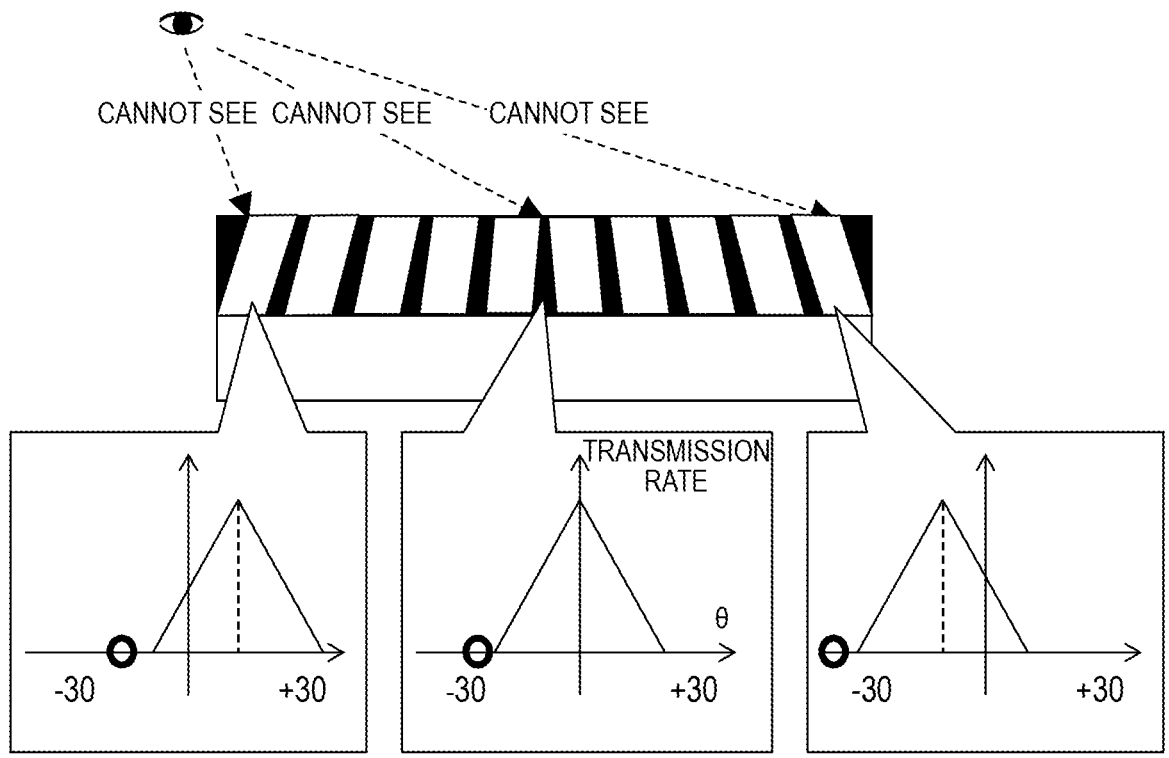

FIGS. 5A and 5B are diagrams for illustrating the effects when the optical element 100 in the first embodiment is used.

Figure 18A:
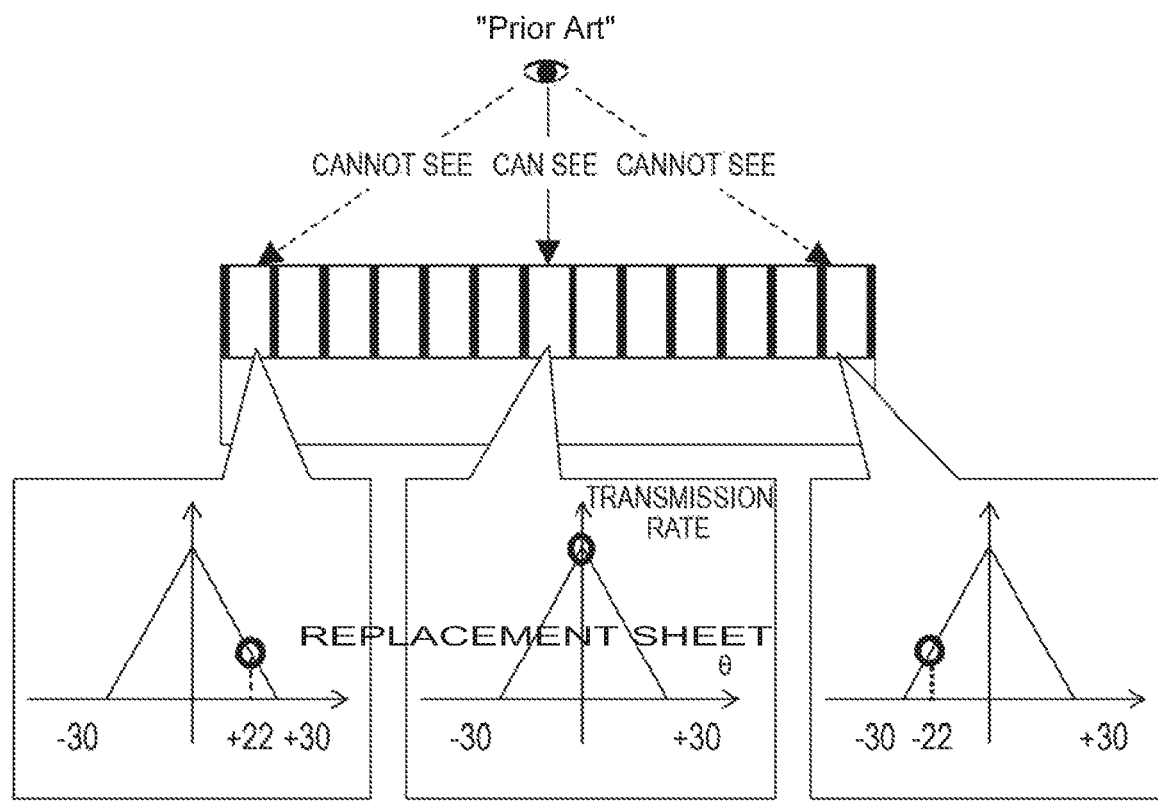
FIGS. 18A and 18B are diagrams for illustrating a problem of a microlouver.
Figure 18B:
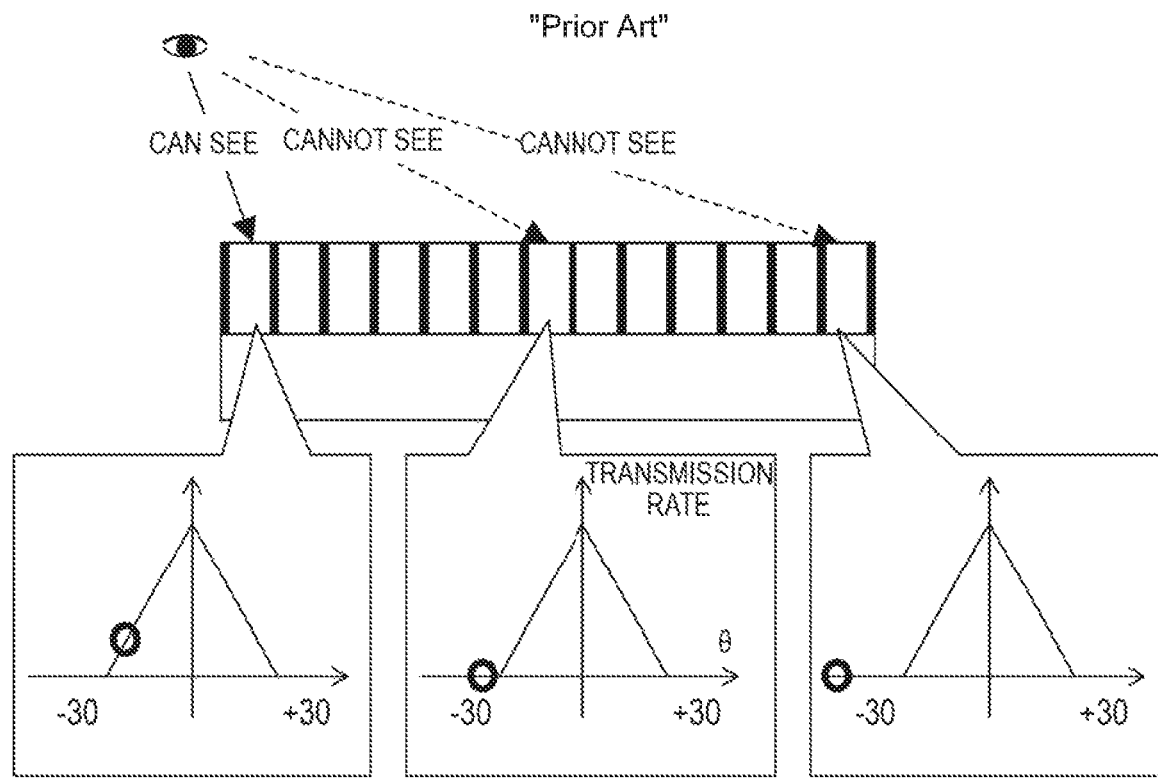

Compared to the conventional microlouver (optical element) illustrated in FIGS. 18A and 18B, the optical element 100 in the first embodiment enables the observer to see well an image at the peripheral region of the liquid crystal display device and further, prevents peeping the liquid crystal display device.

The graphs in FIGS. 5A and 5B represent the relation between the outgoing angle of the light that goes out from a transparent layer 120 and the transmission rate. In the following description, the relation represented by these graphs is also referred to as transmission rate characteristics.

The inclination of the transparent layer 120 and the light absorbing layer 140 is characterized by the deflective property of the transparent substrate 110. Now, the deflective property of the transparent substrate 110 is described.

Figure 6:
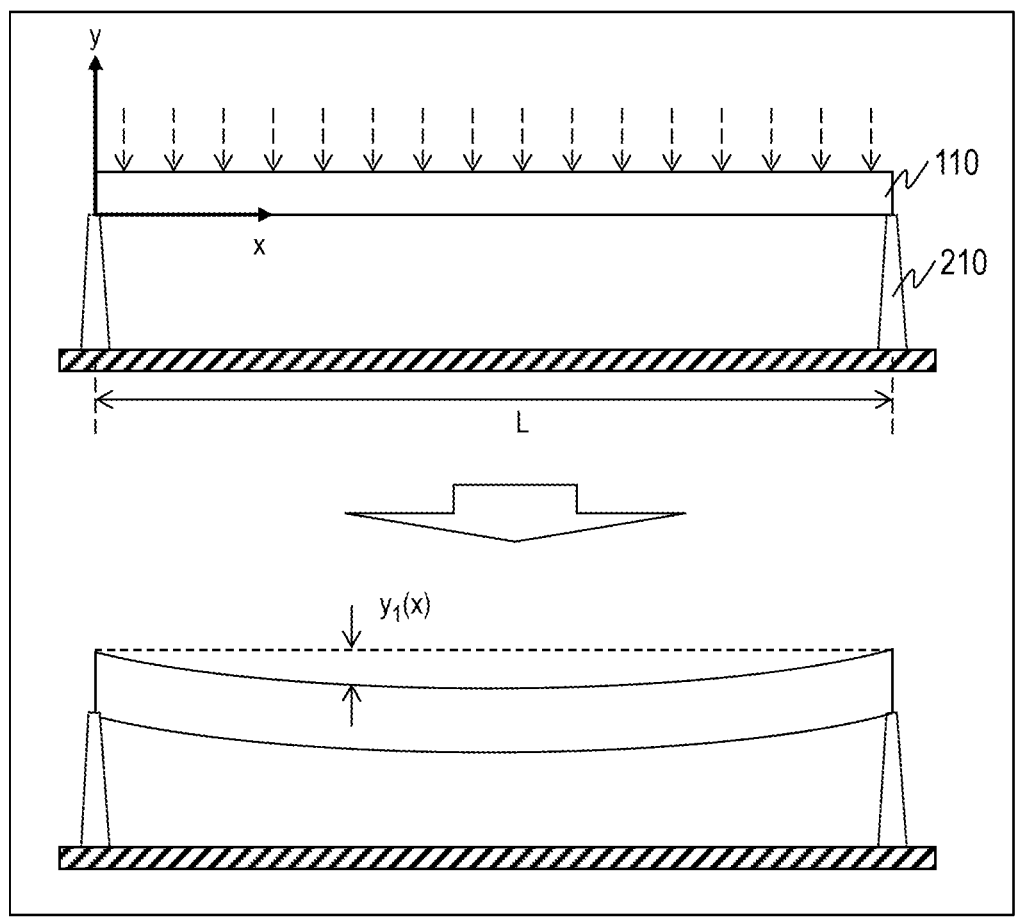
FIG. 6 is a diagram for physically explaining generation of deflection of a transparent substrate in the first embodiment.
Figure 7:
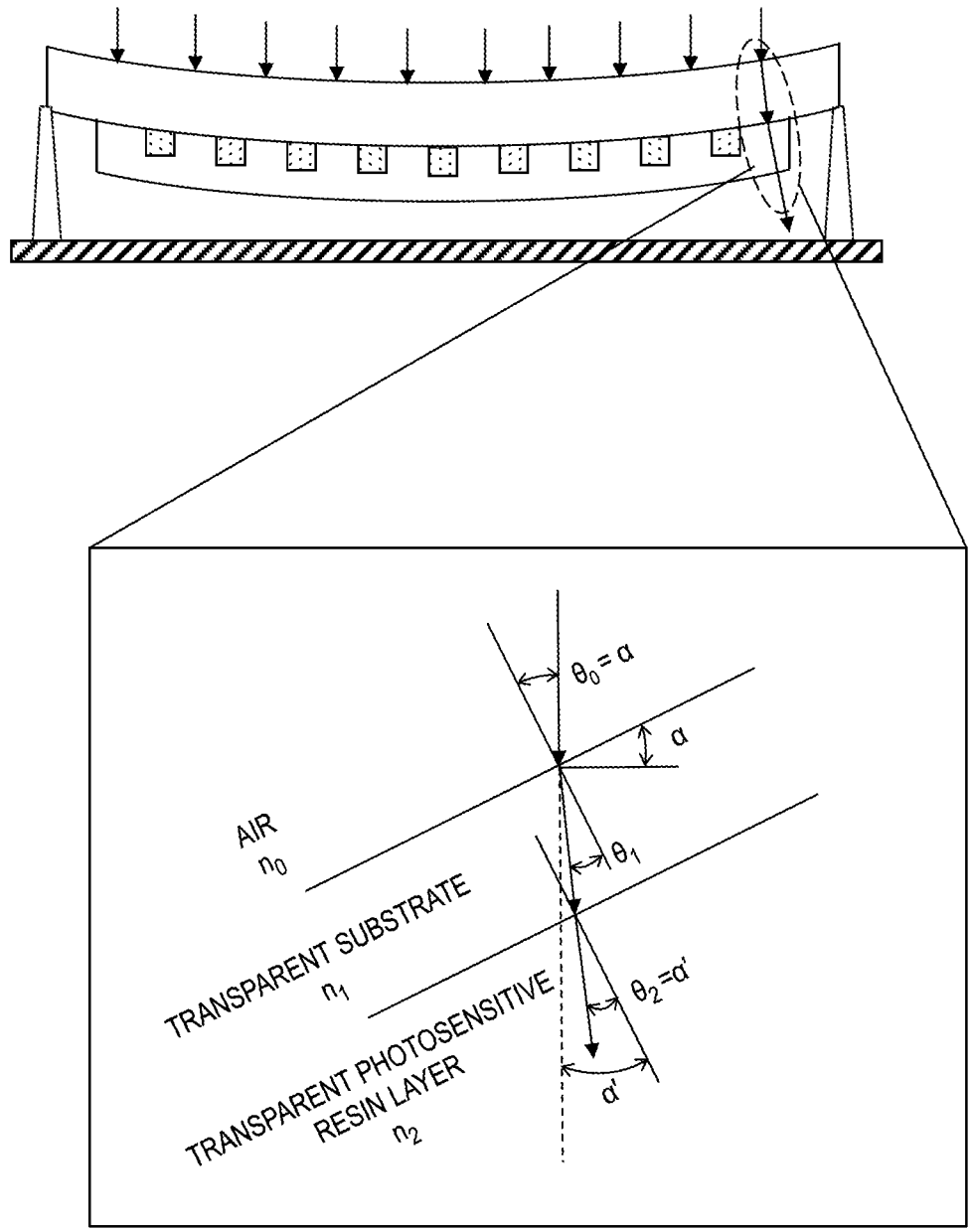
FIG. 7 is a diagram for explaining the deflective property of the transparent substrate in the first embodiment.
Figure 8:
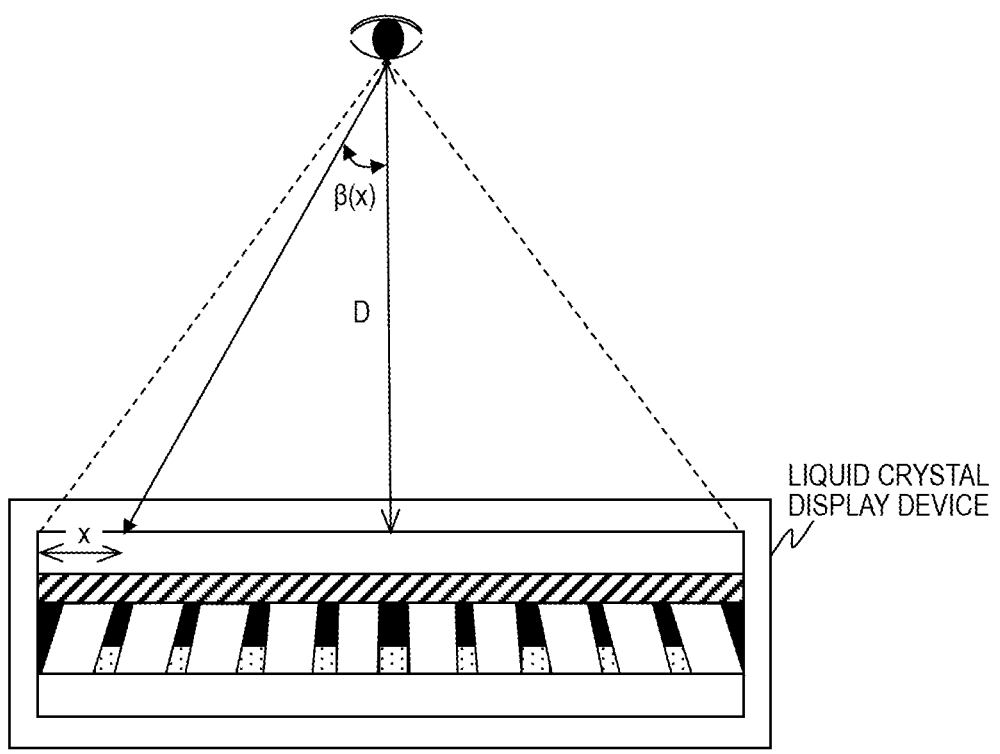
FIG. 8 is a diagram for explaining an example of the angle of sight of an observer who observes a liquid crystal display device including the optical element in the first embodiment.

FIG. 6 is a diagram for physically explaining generation of deflection of the transparent substrate 110 in the first embodiment. FIG. 7 is a diagram for explaining the deflective property of the transparent substrate 110 in the first embodiment. FIG. 8 is a diagram for explaining an example of the angle of sight of an observer who observes the liquid crystal display device including the optical element 100 in the first embodiment.

As illustrated in FIG. 6, when the transparent substrate 110 is set to the support device 210 for supporting the both sides of the transparent substrate 110, load is applied in the directions parallel to the gravity. FIG. 6 omits the conductive light-blocking layer 130 and the transparent photosensitive resin layer 200 because their weights can be ignored. Since the distribution of the substances is substantially uniform in the transparent substrate 110, the magnitude of the load is the same all over the transparent substrate 110, regardless of the position. As illustrated in FIG. 6, the transparent substrate 110 deflects because of its own weight.

In the plane of the flat transparent substrate 110, an axis x is defined along a side perpendicular to a side supported by the support device 210 and let L to be the length of the side or the length of the transparent substrate 110. Accordingly, the axis x ranges from 0 to L. Furthermore, an axis y is defined in the direction of the normal to the plane of the transparent substrate 110. An end of the transparent substrate supported by the support device 210 is defined as the origin of the x-y plane. Let $y_1(x)$ to be the magnitude of the deflection at a point x.

For convenience of explanation, a case where the deflected transparent substrate 110 is irradiated with light is used to describe the deflective property of the transparent substrate 110; however, in the case where the flattened transparent substrate 110 is irradiated with light, the same property can be observed because of the inclination of the transparent layer 120 and the light absorbing layer 140.

Incident light on the optical element 100, such as exposure light, is refracted to a given direction and goes out from the optical element 100. At this time, the outgoing angle α'(x) (first angle α'(x)) indicates a characteristic that depends on the magnitude of deflection $y_1(x)$. More specifically, it indicates a characteristic that depends on the inclination α(x) (fourth angle α(x)) of the tangent of the arc generated by the deflection, as expressed by the following formula (2):

$$\alpha(x) = \tan^{-1}\left(\frac{dy_1(x)}{dx}\right) \quad (2)$$

wherein the differential of the magnitude of deflection $y_1(x)$ can be given by the flowing formula (3):

$$\frac{dy_1(x)}{dx} = -\frac{w}{2EI}\left(L\frac{x^2}{2} - \frac{x^3}{3} - \frac{L^3}{12}\right) \quad (3)$$

In Formula (3), E represents the Young's modulus; I represents the second moment of area; and w represents the load. In this embodiment, the second moment of area I and the load w are given by the following formulae (4) and (5):

$$I = \frac{bh^3}{12} \quad (4)$$

$$w = \rho g S \quad (5)$$

In these formulae, b represents the length of the side of the transparent substrate 110 supported by the support device 210; h represents the thickness of the transparent substrate 110; ρ represents the density of the transparent substrate 110; g represents the acceleration of gravity; and S represents the section area of the transparent substrate 110. Since the section area is the product of h and b, the inclination of the tangent expressed by the formula (3) takes a value independent from b.

When the Fresnel equations are taken account of as illustrated in FIG. 7, the outgoing angle α'(x) is given by the following formula (6):

$$\alpha'(x) = \sin^{-1}\left[\frac{n_1}{n_2}\sin\left\{\sin^{-1}\left(\frac{n_0}{n_1}\sin\alpha(x)\right)\right\}\right] \quad (6)$$

In this formula, $n_0$ represents the refractive index of the medium the light passes through before entering the transparent substrate 110; $n_1$ represents the refractive index of the transparent substrate 110; and $n_2$ represents the refractive index of the transparent layer 120. The medium in this embodiment is assumed to be air.

Let β(x) (second angle β(x)) to be the angle of sight of the observer determined by the distance D between the liquid crystal display device and the observer and the point x on the transparent substrate 110 (liquid crystal display device). Let φ (third angle φ) to be the threshold angle to attain the lowest desired transmission rate determined based on the transmission rate characteristics.

When the observer is located right in front of the liquid crystal display device as illustrated in FIG. 8, or when x=L/2, β(x) is given by the following formula (7). Although the liquid crystal display device includes other elements such as a backlight, FIG. 8 omits them.

$$\beta(x) = \tan^{-1}\left(\frac{x}{2D}\right) \quad (7)$$

In this embodiment, the deflection of the transparent substrate 110 or the inclination of the transparent layer 120 and the light absorbing layer 140 is configured so that α'(x) representing the deflective property of the transparent substrate 110 satisfies the following formula (8):

$$|\alpha'(x) - \beta(x)| < \varphi \quad (8)$$

This embodiment adjusts the thickness h of the transparent substrate 110 to achieve α'(x) satisfying the formula (8).

In this embodiment, users' subjective evaluation was conducted. The angular range in which the decrease in transmission rate is more than 50% is evaluated as unacceptable level; the angular range in which the decrease in transmission rate is more than 20% but not more than 50% is evaluated as acceptable level; and the angular range in which the decrease in transmission rate is not more than 20% is evaluated as high-quality level.

Figure 9:
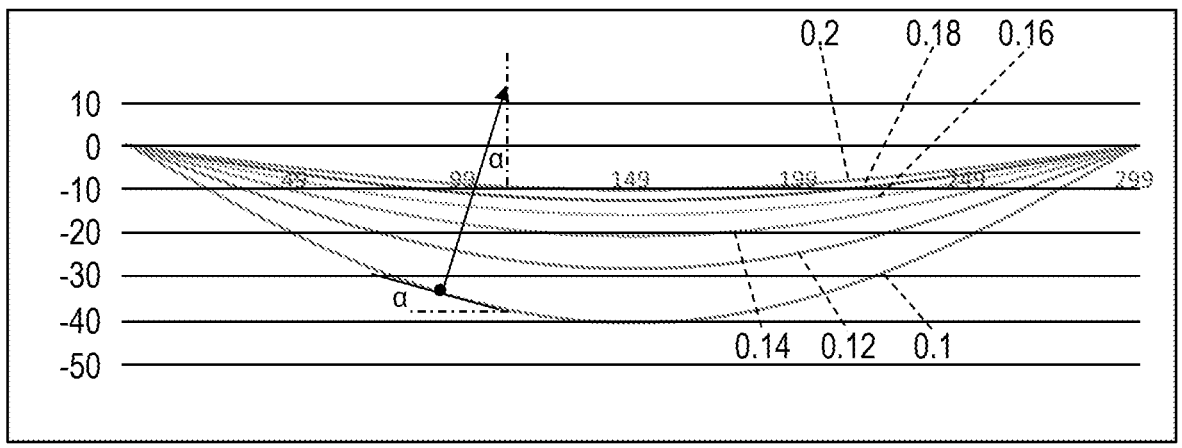
FIG. 9 is a graph indicating the relationship between the magnitude of deflection $y_1(x)$ and the thickness h of the transparent substrate in the first embodiment.
Figure 10:
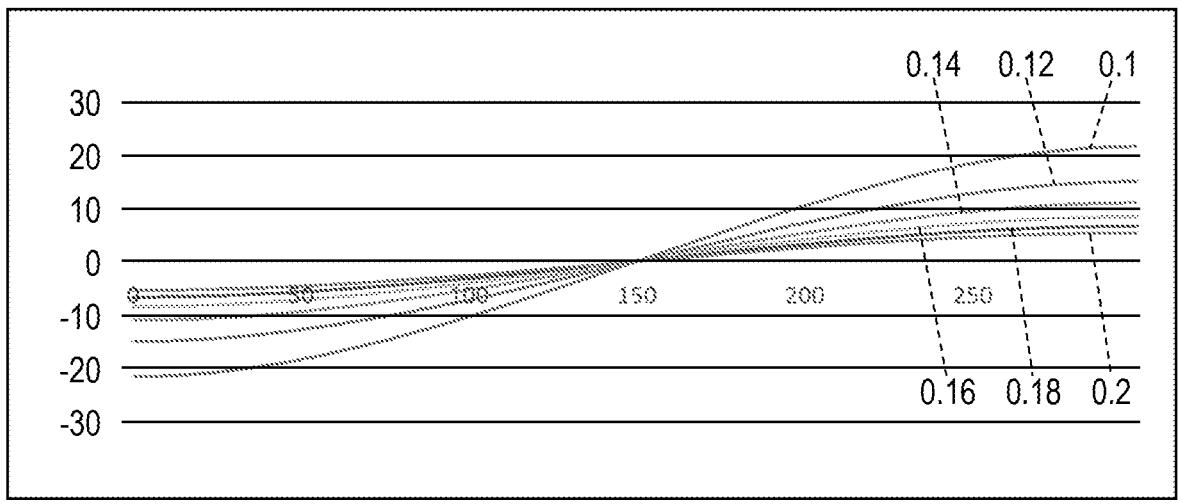
FIG. 10 is a graph indicating the relationship between the inclination of the tangent and the thickness h of the transparent substrate in the first embodiment.
Figure 11:
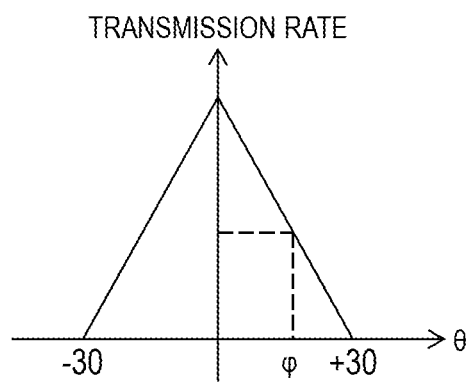
FIG. 11 is a graph indicating transmission rate characteristics of a transparent layer in the first embodiment.
Figure 12:
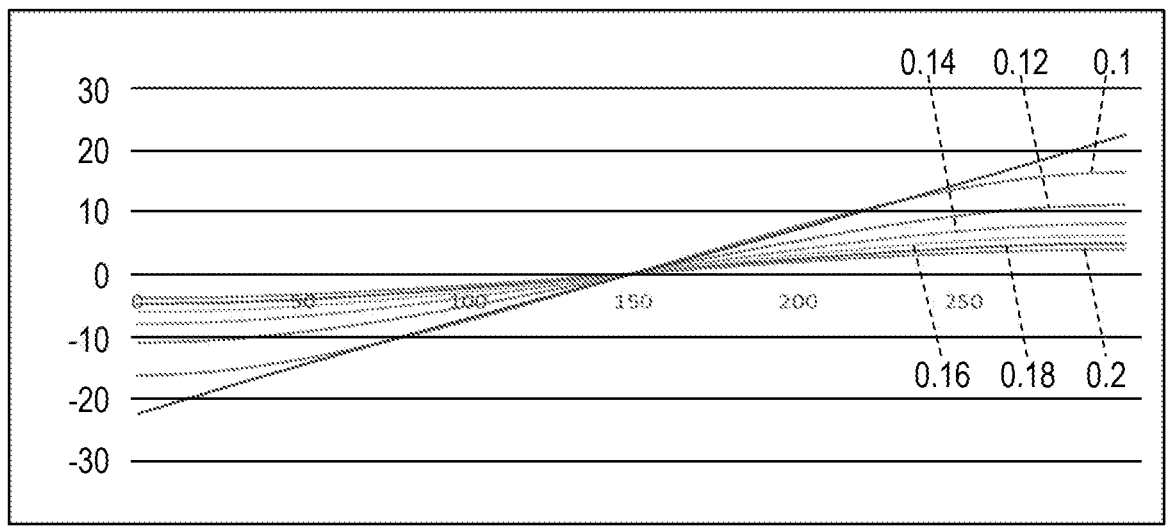
FIG. 12 is a graph for explaining adjustment of the thickness of the transparent substrate in the first embodiment.

FIG. 9 is a graph indicating the relationship between the magnitude of deflection $y_1(x)$ and the thickness h of the transparent substrate 110 in the first embodiment. FIG. 10 is a graph indicating the relationship between the inclination of the tangent and the thickness h of the transparent substrate 110 in the first embodiment. FIG. 11 is a graph indicating the transmission rate characteristics of the transparent layer 120 in the first embodiment. FIG. 12 is a graph for explaining adjustment of the thickness of the transparent substrate 110 in the first embodiment.

As indicated in FIGS. 9 and 10, the magnitude of deflection $y_1(x)$ of the transparent substrate 110 is greater when the thickness h of the transparent substrate 110 is smaller.

The vertical axis in FIG. 9 represents the magnitude of deflection $y_1(x)$ and the horizontal axis represents the point x. The vertical axis in FIG. 10 represents the angle and the horizontal axis represents the point x. In FIG. 10, the inclination of the tangent is converted to the angle of inclination of the transparent layer 120. When plotting β(x) onto the graph of FIG. 10, each β(x) becomes linear as illustrated in FIG. 12.

To manufacture a liquid crystal display device such that a transmission rate at x=L (or x=0) is 50% or more of the maximum value, assign the angle at which the transmission rate becomes 50% of the maximum value in a transparent layer 120 having the transmission rate characteristics illustrated in FIG. 11 to φ. In this case, the desired thickness h to achieve the deflection satisfying the formula (8) is 0.1 mm. Accordingly, the manufacturing system controls the thickness h of the transparent substrate 110 to become 0.1 mm in the step prior to Step SC. As a result, deflection that satisfies the formula (8) can be generated. In other words, when the transparent substrate 110 is flattened, the outgoing angle of the light that goes out from the point x of the transparent layer 120 satisfies the formula (8).

In the case where immersion exposure using a fluid having a refractive index approximately equal to $n_1$ is employed in Steps SC and SD, α'(x) in the formula (8) is replaced by α(x).

The first embodiment employs a light absorbing layer 140 composed of electrophoretic elements but the light absorbing layer 140 is not limited to this. For example, the light absorbing layer 140 can be formed by filling the spaces produced in the transparent layer 120 and the conductive light-blocking layer 130 with black ink made of epoxy resin and pigment. In this case, the optical element 100 can eliminate the transparent electrode layer 150. The optical element 100 works in the narrow viewing field mode all the time.

As described above, the first embodiment makes a transparent substrate 110 controlled to have an appropriate thickness deflect because of its own weight and exposes it from the backside thereof to form a transparent layer 120 inclined with respect to the normal to the flattened transparent substrate 110. Further, the first embodiment fills the spaces produced in the transparent layer 120 and the conductive light-blocking layer 130 with electrophoretic elements to form a light absorbing layer 140 inclined with respect to the normal to the flattened transparent substrate 110. The light that goes out from the inclined transparent layer 120 satisfies the formula (8).

Making the transparent substrate 110 deflect because of its own weight achieves uniform deflection. The manufacturing method in this embodiment can generate uniform deflection without a device for adjusting the deflection; the optical element 100 having a transparent layer 120 satisfying the formula (8) can be manufactured efficiently and at low cost.

Figure 13:
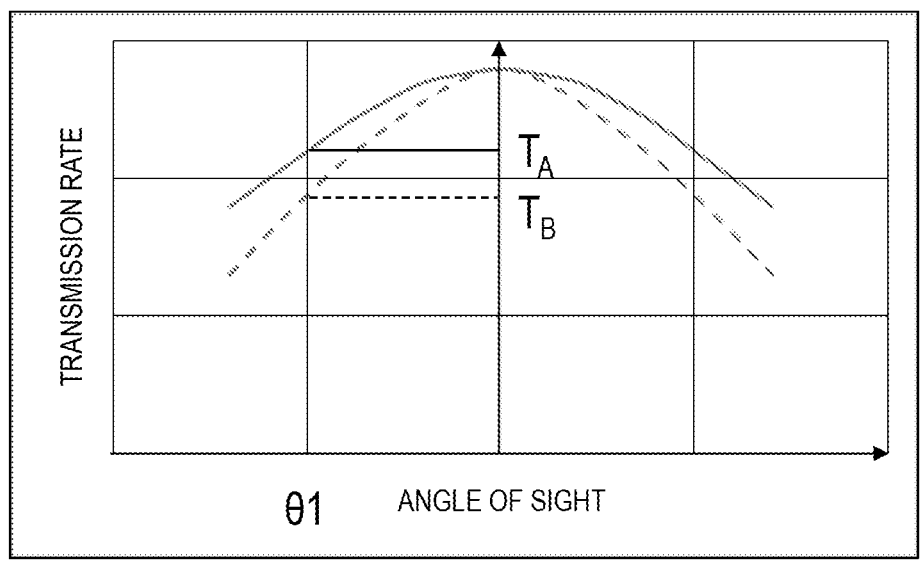
FIG. 13 is a diagram providing transmission rate profiles in relation to the angle of sight.

FIG. 13 is a diagram providing transmission rate profiles in relation to the angle of sight. FIG. 13 includes two transmission rate profiles: a transmission rate profile A in a solid line and a transmission rate profile B in a dashed line; the transmission rates at an angle of sight θ1 are defined as $T_A$ and $T_B$, respectively.

Subjective evaluation on image quality was conducted by eight observers under the condition where an image is displayed at the transmission rate $T_A$ and the transmission rate $T_B$ at the angle of sight θ1 alternately, while varying the transmission rate profile B by design.

Figure 14:
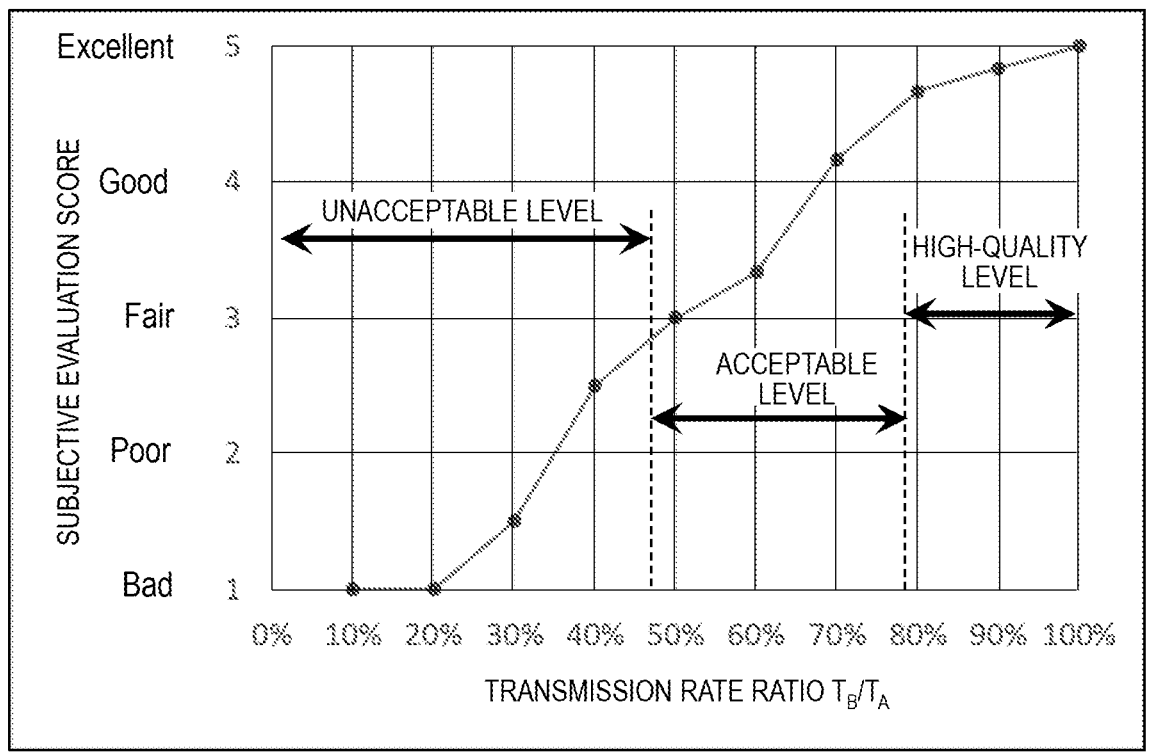
FIG. 14 is a chart providing subjective evaluation scores in relation to the image pattern transmission rate ratio $T_B/T_A$.

FIG. 14 is a chart providing subjective evaluation scores in relation to the image pattern transmission rate ratio $T_B/T_A$. According to this chart, when the transmission rate ratio is down to 80%, the subjective evaluation score among the observers changes little or the image quality is at a high-quality level. When the transmission rate ratio falls under 50%, the subjective evaluation score falls under 3 or the image quality is at an unacceptable level. When the transmission rate ratio ranging from 50% to 80%, image quality is at an acceptable level.

In view of the above-described subjective evaluation scores, the angle φ in the formula (8) is preferably within a range where the change in transmission rate is not more than 50% (acceptable level), more preferably, within a range where the change is not more than 20% (high-quality level).

Figure 15A:
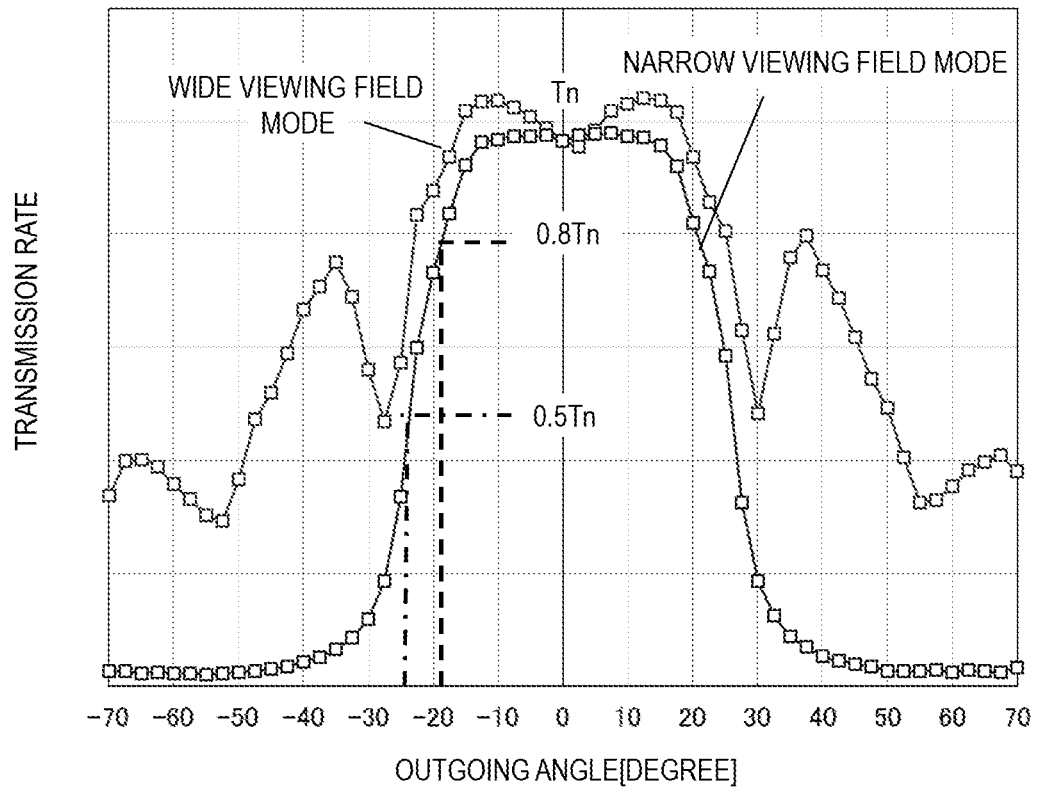
FIG. 15A and FIG. 15B are graphs indicating the transmission rate characteristics of the transparent layer in the first embodiment.
Figure 15B:
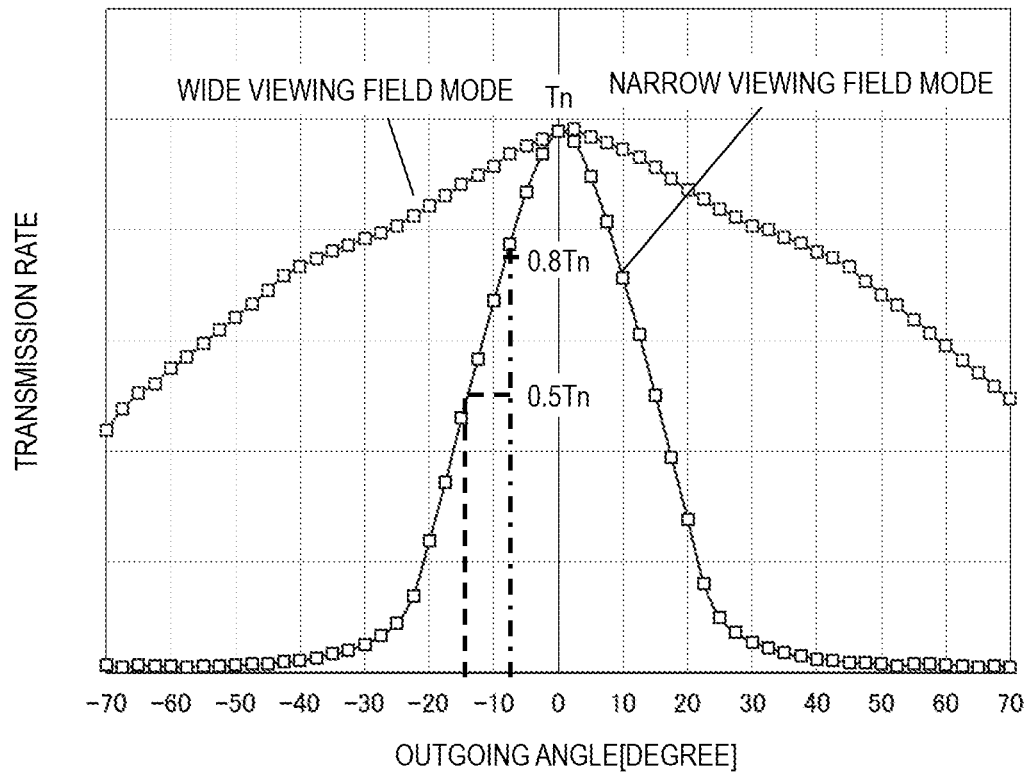

FIG. 15A is a graph indicating the transmission rate characteristics of a transparent layer 120 when ethyl benzoate is used as the dispersion medium in the electrophoretic elements. FIG. 15B is a graph indicating the transmission rate characteristics of a transparent layer 120 when methyl naphthalene is used as the dispersion medium in the electrophoretic elements. The both graphs are measured with the vertical structure illustrated in FIG. 16.

In these graphs, Tn is the maximum transmission rate; 0.8Tn is 80% of the maximum transmission rate or the threshold for the aforementioned high-quality level; and 0.5Tn is 50% of the maximum transmission rate or the threshold for the aforementioned acceptance level.

When ethyl benzoate is used as dispersion medium, the transmission rate is unchanged in a specific angular range from the center. On the other hand, when methyl naphthalene is used as dispersion medium, a sharp change was observed with change in the angle about the center.

Figure 16:
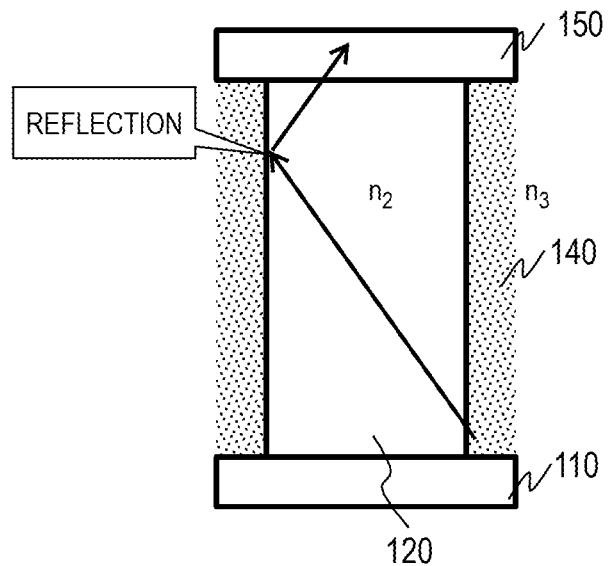
FIG. 16 is a diagram for explaining the light that passes through the transparent layer in the first embodiment.

FIG. 16 is a diagram for explaining the light that passes through the transparent layer 120. The light in a narrow viewing field mode is discussed here.

If the refractive index $n_2$ of the transparent layer 120 is lower than the refractive index $n_3$ of the light absorbing layer 140, the incident light is refracted at the interface between the transparent layer 120 and the light absorbing layer 140 before entering the light absorbing layer 140. It is considered that the light that enters the light absorbing layer 140 is absorbed by the electrophoretic element.

For example, a transparent layer 120 made of SU-8 has a refractive index of approximately 1.58 and a light absorbing layer 140 including a medium of methyl naphthalene has a refractive index of appropriately 1.62; accordingly, a graph as illustrated in FIG. 15B can be obtained.

If the refractive index $n_2$ of the transparent layer 120 is the same as the refractive index $n_3$ of the light absorbing layer 140, light enters the light absorbing layer 140 without being refracted at the interface between the transparent layer 120 and the light absorbing layer 140. It is considered that the light that enters the light absorbing layer 140 is absorbed by the electrophoretic element.

If the refractive index $n_2$ of the transparent layer 120 is higher than the refractive index $n_3$ of the light absorbing layer 140, it is considered that the incident light is refracted at the interface between the transparent layer 120 and the light absorbing layer 140.

Since the refractive index of SU-8 is approximately 1.58 and the refractive index of ethyl benzoate is approximately 1.52, a graph as illustrated in FIG. 15A can be obtained.

The angle φ takes different values depending on the usage of the liquid crystal display device. For example, when high visibility of the peripheral region of the screen is desired for the observer, the angle at which the transmission rate at x=L is 80% of the maximum value is assigned to φ. In this case, an optical element that attains desired visibility in the peripheral region of the screen can be manufactured if selecting electrophoretic elements including ethyl benzoate as dispersion medium. For another example, when the angle at which the transmission rate at x=L is 50% of the maximum value is assigned to φ, an optical element that attains desired visibility in the peripheral region of the screen can be manufactured if selecting electrophoretic elements including methyl naphthalene as dispersion medium.

Second Embodiment

The second embodiment is described. Hereinafter, the second embodiment is described mainly in the differences from the first embodiment.

Figure 17:
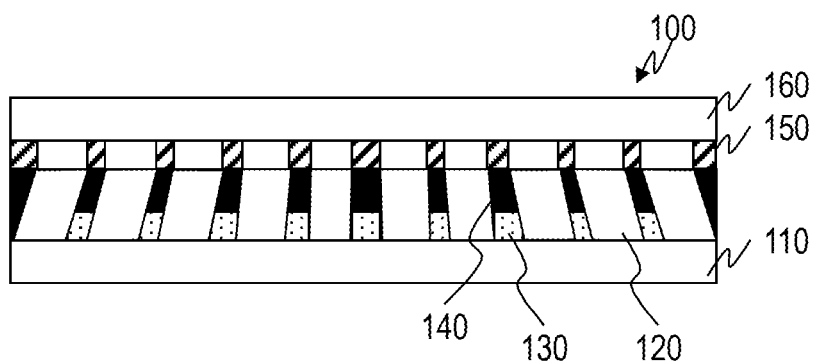
FIG. 17 is a cross-sectional diagram of an optical element in a second embodiment.

FIG. 17 is a cross-sectional diagram of an optical element in the second embodiment.

As illustrated in FIG. 17, the optical element 100 in the second embodiment is different in the shape of the transparent electrode layer 150. Specifically, the transparent electrode layer 150 is formed in such a shape that the transparent electrodes as the members of the transparent electrode layer 150 are in contact with only the light absorbing layer 140.

The second embodiment can effectively generate an electric field in the direction of inclination of the light absorbing layer 140.

As set forth above, embodiments of this disclosure have been described; however, this disclosure is not limited to the foregoing embodiments. Although the embodiments have been described using a liquid crystal display device as a representative case, the display device can be a different display device such as an organic EL display device. Those skilled in the art can easily modify, add, or convert each element in the foregoing embodiment within the scope of this disclosure. A part of the configuration of one embodiment can be replaced with a configuration of another embodiment or a configuration of an embodiment can be incorporated into a configuration of another embodiment.

What is claimed is:

1. An optical element comprising:
a transparent substrate;
a transparent layer; and
a light absorbing layer,
wherein the transparent layer and the light absorbing layer are patterned on the transparent substrate,
wherein at least a part of the transparent layer and at least a part of the light absorbing layer are inclined at given angles with respect to the normal to a plane of the transparent substrate where the transparent layer and the light absorbing layer are patterned,
wherein the inclination satisfies the following formula (1):

$$|\alpha'(x) - \beta(x)| < \varphi \tag{1}$$

where $\alpha'(x)$ represents a first angle, which is an outgoing angle of light emitted from under the transparent substrate toward the transparent layer at a point x on an axis parallel to the plane; $\beta(x)$ represents a second angle, which is an angle of sight of an observer who receives the light coming out from the transparent layer, the angle of sight being determined by the point x and an observation point of the observer; and $\varphi$ represents a third angle, which is an angle at which a transmission rate of light emitted from the transparent layer changes no more than 50% within the plane of the transparent layer,
wherein the inclination satisfies the formula (1) at a plurality of points along the axis parallel to the plane.

2. The optical element according to claim 1, wherein the first angle $\alpha'(x)$ is given by the following formula (2):

$$\alpha'(x) = \sin^{-1}\left[\frac{n_1}{n_2}\sin\left\{\sin^{-1}\left(\frac{n_0}{n_1}\sin \alpha(x)\right)\right\}\right] \tag{2}$$

where $n_0$ represents a refractive index of a medium the light passes through before entering the transparent substrate, $n_1$ represents a refractive index of the transparent substrate, $n_2$ represents a refractive index of the transparent layer, and $\alpha(x)$ represents a fourth angle given by the following formula (3):

$$\alpha(x) = \tan^{-1}\left(\frac{dy(x)}{dx}\right) \tag{3}$$

which is calculated using the following formula (4) that differentiates a magnitude of deflection y(x) of the transparent substrate:

$$\frac{dy(x)}{dx} = -\frac{w}{2EI}\left(L\frac{x^2}{2} - \frac{x^3}{3} - \frac{L^3}{12}\right) \tag{4}$$

where L represents a length of the transparent substrate in an inclining direction of the inclination, E represents a Young's modulus of the transparent substrate, w represents a load to bend the transparent substrate, and I represents a second moment of area, and
wherein the second angle $\beta(x)$ is given by the following formula (5):

$$\beta(x) = \tan^{-1}\left(\frac{x}{2D}\right) \tag{5}$$

where D represents a distance between a display device including the optical element and the observer who observes the display device right in front of the display device.

3. The optical element according to claim 2, wherein I satisfies the following formula (6):

$$I = \frac{bh^3}{12} \tag{6}$$

where b represents a length of a side of the transparent substrate and h represents a thickness of the transparent substrate.

4. The method according to claim 3, wherein the thickness of the transparent substrate is 0.1 mm to 0.2 mm.

5. The optical element according to claim 2, further comprising:
an electrode layer between the transparent substrate and the light absorbing layer, and
a transparent electrode layer provided to be opposed to the transparent substrate and to sandwich the transparent layer and the light absorbing layer with the transparent substrate,
wherein the transparent electrode layer is composed of transparent electrodes in contact with only the light absorbing layer.

6. The optical element according to claim 1, wherein a degree of the third angle $\varphi$ is a range in which the transmission rate of light emitted from the transparent layer changes within 20% within the plane of the transparent layer.

* * * * *